Oct. 6, 1964
C. W. PRICE
3,152,068
SWEETENING OF SOUR HYDROCARBONS
Filed June 20, 1960
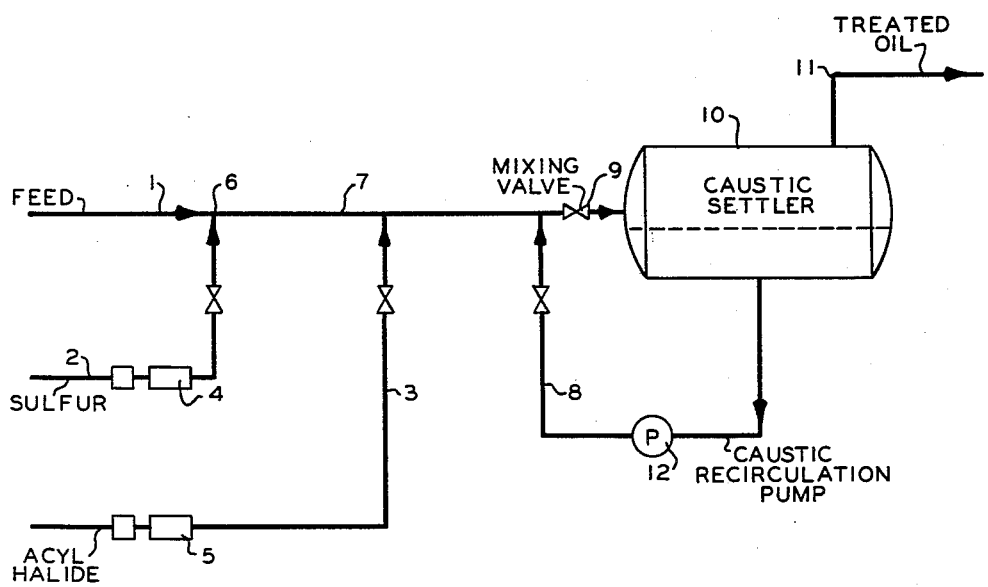
INVENTOR.
C. W. PRICE
BY
ATTORNEYS

United States Patent Office 3,152,068
Patented Oct. 6, 1964

3,152,068
SWEETENING OF SOUR HYDROCARBONS
Clifford W. Price, Bartlesville, Okla., assignor to Phillips Petroleum Company, a corporation of Delaware
Filed June 20, 1960, Ser. No. 37,452
13 Claims. (Cl. 208—204)

This invention relates to the treatment of sour hydrocarbons. In one of its aspects, the invention relates to the treatment of hydrocarbon distillates by admixing therewith a small quantity of acyl halide and then treating the distillates with caustic. In another aspect, the invention relates to the treatment of jet fuel by first admixing therewith a quantity of acyl halide such as acetyl chloride and then treating with caustic. In a further aspect of the invention, hydrocarbon distillates which can be gasoline, stove and lamp fluid, jet fuels, kerosene, and heating oils can be sweetened by the use of controlled amounts of an acyl halide followed by a caustic wash, for example, 50 Baumé caustic. In still another aspect, the invention relates to the sweetening of sour hydrocarbons by admixing therewith a small quantity of sulfur and then treating the hydrocarbon with an acyl halide, such as acetyl chloride, and then with caustic. In another aspect, the invention relates to the treatment of sour hydrocarbons by first admixing therewith a small quantity of surfur and then treating with caustic.

In U.S. Patent 2,889,195, issued June 2, 1959, there is set forth and claimed a method of refining petroleum oils comprising admixing with a petroleum oil stock in the liquid phase an organic acid anhydride in a minimum amount of at least 0.001 percent by weight of the oil, thereafter agitating the admixture with a concentrated aqueous alkali hydroxide solution containing at least 25 percent by weight of alkali hydroxide, the amount of said alkali hydroxide being sufficient to neutralize the acid of said anhydride produced by reactions between said anhydride and other substances present in said oil, the volume of said concentrated alkali hydroxide solution being sufficient to obtain intimate mixing, and separating the treated oil from the resultant mixture.

The patent points out most crude petroleums include various constituents, sulfur compounds, phenolic and nitrogenous bodies, acids, and the like, which impart to the various fractions produced in the processing of the crude petroleum, undesirable physical and chemical characteristics. Also, the patentee points out that in catalytic cracking of petroleum fractions, there is produced refractory recycle stock which is withdrawn from the system and which includes a large proportion which falls in the household fuel or burning oil range and that this stock is commonly referred to as "light cycle oil" or "number 2 fuel oil" and is found to be unstable in storage, losing color rapidly and developing gummy precipitates and possessing highly undesirable odors, all of which makes the product undesirable and often a source of mechanical difficulty to use. The patentee prefers acetic anhydride as the reagent for use in the first stage treatment and concentrated aqueous sodium hydroxide solution for the second stage treatment. Other acid anhydrides, both aliphatic and aromatic, may be used according to the patentee.

This invention relates to a considerable improvement in a process which was effected using acetic anhydride and caustic which are the agents used in said patent.

It has been found that certain stocks mentioned herein for some reason are not sweetened using acetic anhydride and caustic but, according to the present invention, that if the oil charge is admixed with a small quantity of sulfur and treated with an acyl halide, such as acetyl chloride, and caustic washed, the product is sweetened. Still further, according to the present invention, hydrocarbon stocks can be sweetened by treating with an acyl halide and caustic. Also, according to the present invention, an oil charge can be sweetened by admixing therewith a small quantity of sulfur and caustic washing.

An object of this invention is to provide a treatment of sour hydrocarbons. Another object of this invention is to provide a sweetening treatment for jet fuels. Still another object of the invention is to provide a sweetening process which is applicable to hydrocarbon distillates which are gasoline, stove and lamp fluid, jet fuels, kerosenes, and heating oils, for example, number 1 heating oils. It is a further object of this invention to provide an improved process in which a sour hydrocarbon is sweetened using certain amounts of ingredients in different combinations. Another object of the present invention is to provide a process for sweetening a wider variety of stocks. Another object of the invention is the treatment of petroleum oils to render them free of undesirable characteristics such as bad odor, poor color stability in storage, and formation of gum-like materials in storage.

Other aspects, objects, and the several advantages of the invention are apparent from a study of the disclosure, the drawing, and the appended claims.

According to the present invention, there is provided a process for the sweetening of a hydrocarbon or oil which comprises admixing with the hydrocarbon or oil a controlled amount of sulfur, treating with an acyl halide, and then with a caustic wash. Still further, according to the present invention, there is provided a process for the sweetening of a hydrocarbon which comprises treating the hydrocarbon with an acyl halide, such as acetyl chloride, and caustic washing the hydrocarbon. Also, according to the present invention, there is provided a method of treating a hydrocarbon to remove contaminants therefrom comprising admixing with the hydrocarbon a small quantity of sulfur and caustic treating the hydrocarbon.

The drawing illustrates diagrammatically one embodiment of the invention.

Referring to the drawing, oil charged at 1 is admixed with sulfur charged at 2, and then with an acyl halide charged at 3. Pumps 4 and 5 are proportioning pumps and the distance of time lag between points 6 and 7, which are the junctures, respectively, of pipes 1 and 2 and pipe 1 and 3, is sufficient to allow the sulfur to become thoroughly and intimately admixed with the oil charge before the acyl halide is added thereto. The mixture thus obtained continues through pipe 1 and is admixed with circulating caustic solution from pipe 8 passing through mixing valve 9 and into treatment tank 10 wherein treatment is accomplished or completed, treated oil being taken off through pipe 11 and caustic which has settled being recycled by pipe 8 and pump 12.

Although it does not now appear to be critical how much time the sulfur is in the oil charge before the acyl halid is added, it is preferred that the sulfur be thoroughly admixed with the charge. The sulfur can be used generally in amounts in the range of approximately 0.002 to 0.0035 weight percent for very satisfactory results. Obviously, one skilled in the art in possession of this disclosure, having studied the same, will recognize that sulfur in too large a quantity is to be avoided and, therefore, can determine by mere routine test just how much sulfur is sufficient to obtain a satisfactory result. Thus, although the range given is preferred, a concept of the invention is in the addition of the sulfur and not primarily in the addition of any specific or fixed amount of sulfur. It is believed that the added sulfur either catalyzes the formation of harmless sulfur compounds from the detrimental sulfur compounds, e.g., mercaptans and related compounds, present in the unprocessed hydrocarbon or acts as a synergist in the formation of the harmless compounds. Similarly, for quantities and proportions of the other treating agents which are used.

The caustic used should be preferably at least about 40° Baumé to 50° Baumé since weaker caustics are not always adequate. Suitable caustics are sodium hydroxide and potassium hydroxide. Sulfur added in excess of approximately 0.0034 weight percent will tend to render the stock corrosive. However, upon storage, the free sulfur appears to continue to react and the product will become less corrosive or non-corrosive.

Sulfur can be added to the oil or hydrocarbon being treated as a solution in a solvent. The preferred solvent is the specific oil being treated, e.g., jet fuel as the solvent for elemental sulfur when jet fuel is being processed, burning oil as the solvent when burning oil is being treated, etc.

No. 1 stove oil was treated using (1) sulfur, acetyl chloride, and caustic, (2) sulfur and caustic, and (3) acetyl chloride and caustic.

The following table shows the results obtained.

The No. 1 stove oil shown in run number 1 in the data had the following properties:

Gravity, ° API _____ 41.5
Pour point, ° F. _____ −25
Flash, TCC, ° F. _____ 140
Distillation:
   IBP _____ 355
   10% evap. _____ 392
   40% _____ 437
   50% _____ 452
   70% _____ 485
   90% _____ 532
   End point _____ 565
Original RSH sulfur, wt. percent _____ 0.00110
Treated RSH sulfur, wt. percent _____ 0.00030

To further illustrate my invention, in a specific operation, 1000 barrels of raw jet fuel is prewashed with 7.4

TABLE I

*Acetyl Chloride Treatment of No. 1 Stove Oil*

| Run No. | P.p.m. Acetyl Chloride | Ml. Sample Size | Caustic Wash, Bé. | Sulfur, ml. of Solution [2] | Initial | Mercaptan, 24 Hour Storage | Wt. Percent 48 Hour Storage | 72 hour Storage | Doctor Negative |
|---|---|---|---|---|---|---|---|---|---|
| 1 | 100 | 800 | 50 | 25 | 0.0011 | 0.0009 | 0.0007 | 0.0003 | Yes. |
| 2 | 0.0 | 800 | 50 | 25 | 0.0011 | 0.0008 | 0.0007 | 0.00054 | Yes. |
| 3 | 100 | 800 | 50 | 0.0 | 0.0018 | 0.0014 | 0.0009 | 0.00054 | Yes. |
| 4 | 100 | 800 | None | 0.0 | 0.0028 | 0.0028 | 0.0028 | 0.0028 | No. |
| 5 | 100 | 800 | 20 | 0.0 | 0.0028 | 0.0028 | 0.0026 | 0.0026 | No. |
| 6 | [1] 0.0 | | None | 0.0 | 0.0028 | | | | |
| 7 | 100 | 800 | None | 25 | 0.0028 | 0.0028 | 0.0028 | 0.0026 | No. |
| 8 | 100 | 800 | 20 | 25 | 0.0028 | 0.0028 | 0.0026 | 0.0020 | No. |

[1] Raw No. 1 Stove Oil.
[2] 0.072 wt. percent sulfur.

No. 1 stove oil could not be sweetened utilizing a treatment with acetic anhydride followed by caustic treatment. This oil was sweetened when treated in accordance with this invention.

It is not understood at this time why some hydrocarbons can be sweetened in accordance with the process of U.S. Patent 2,889,195 and why some stocks cannot be so sweetened. However, these stocks which could not be sweetened utilizing the process of U.S. Patent 2,889,195 were sweetened when processed in accordance with my invention. One skilled in the art, in possession of my disclosure, can routinely test his stocks, those which do not sweeten without the treatment of invention will successfully sweeten when processed in accordance with my invention.

In some operations, a precaustic wash using approximately ten weight percent caustic aqueous solution may be required to remove hydrogen sulfide from the hydrocarbon to be treated in accordance with my invention. Further, when using the preferred treatment of sulfur, acyl halide, and caustic, the caustic is the final treatment; however, either the acyl halide or the sulfur may be the first treating agent added to the hydrocarbon.

The acyl halides which can be used in my invention include acetyl bromine (ethanoyl bromide), acetyl chloride (ethanoyl chloride), acetyl fluoride (ethanoyl fluoride), and acetyl iodide (ethanoyl iodide). These acyl halides may be used singly or in combination. The preferred acyl halide is acetyl chloride, however, used as the sole acyl halide.

The range of added sulfur is preferably 0.0020 to 0.0035 weight percent of the hydrocarbon; the range of added acyl halide (measured as acetyl chloride) is from 50 to 200 parts per million based on the hydrocarbon, and is preferably about 100 p.p.m.; the strength range of final caustic wash is 30 to 50 Baumé, preferably 40 to 50 Baumé, NaOH (or equivalent KOH), and the liquid volume ratio of caustic to hydrocarbon used is 0.5 to 1.0 up to about 2.0 to 1.0, preferably 1.0 to 1.0.

Bé. caustic in a volume ratio of 1:1 at ambient conditions; the hydrocarbon layer is then thoroughly admixed with sulfur, the sulfur content being 0.00219 weight percent of the total admixture; the sulfur is added to the jet fuel as a solution in jet fuel, 125 gallons of jet fuel added being saturated (0.729 weight percent) with sulfur; to this total admixture is added acetyl chloride (liquid) to result in 90 parts per million acetyl chloride in the total admixture; the admixture is thoroughly admixed for 20 seconds; then the total admixture is thoroughly admixed with 45 Bé. NaOH (1:1 volume ratio) for one minute, and the jet fuel is separated therefrom; after 72 hours the jet fuel is non-corrosive, doctor negative, and shows the mercaptan sulfur reduced from 0.00360 weight percent to only 0.00045 weight percent.

Reasonable variation and modification are possible within the scope of the foregoing disclosure, the drawing, and the appended claims to the invention the essence of which is that sour hydrocarbons can be sweetened by treating with a small amount of sulfur and/or an acyl halide followed by a caustic wash.

I claim:

1. A method for treating a hydrocarbon which comprises admixing therewith sulfur in an amount of at least 0.002 weight percent of the hydrocarbon, treating the mixture thus obtained with acyl halide in an amount of at least 50 parts per million and then with a caustic wash.

2. A method of treating petroleum oils to sweeten the same comprising admixing therewith acyl halide in an amount of at least 50 parts per million and then caustic washing the oils thus treated, and recovering the treated oils from the operation.

3. A method of treating a hydrocarbon which comprises adding elemental sulfur thereto in an amount of at least 0.002 weight percent of the hydrocarbon, then adding acetyl chloride thereto in an amount of at least 50 parts per million, and treating the thus treated hydrocarbon with an alkali metal hydroxide solution.

4. A method of sweetening hydrocarbon distillates, such as gasoline, stove and lamp fluid, jet fuels, kerosene, and heating oils, comprising treating said distillates with an acyl halide in an amount of at least 50 parts per million and subjecting the thus treated distillates to a caustic.

5. A method of refining petroleum oils comprising admixing therewith an amount of sulfur in the range of about 0.0020 to 0.0035 weight percent of the oil and an amount of acetyl chloride in the range of about 50 to 200 parts per million, and then admixing the resulting admixture with a concentrated aqueous alkali hydroxide solution in the range of about 30 to 50 Baumé.

6. A method of treating petroleum oils to render them free of undesirable characteristics such as bad odor, poor color stability in storage, and formation of gum-like materials in storage, comprising admixing therewith an amount of acetyl chloride in the range of 50 to 200 parts per million and a caustic of at least 30 Baumé.

7. A method of refining petroleum oil which comprises admixing with a petroleum oil stock acetyl chloride in an amount of at least 50 p.p.m. by weight of the oil; agitating the admixture with an alkali hydroxide solution; and thereafter separating the treated oil from the resultant mixture.

8. A method of treating petroleum oils to render them free of undesirable characteristics such as bad odor, poor color stability in storage, and formation of gum-like materials in storage, comprising admixing therewith acetyl chloride in an amount of at least 50 parts per million and then treating the resulting mixture with a caustic.

9. A method of refining petroleum oil which comprises admixing a petroleum oil stock and acetyl chloride in an amount of at least 50 parts per million, agitating the admixture with an alkali hydroxide solution, and thereafter separating the treated oil from the resultant mixture.

10. A method of treating petroleum oil to sweeten the same comprising admixing therewith an acyl halide in an amount in the range of from about 50 to about 200 parts per million, and then caustic washing the oil thus treated, and recovering the treated oil from the operation.

11. A method according to claim 10 wherein the strength of the caustic wash is in the range of about 30 to about 50 Baumé.

12. A method of treating a hydrocarbon to sweeten the same which comprises admixing therewith sulfur in an amount in the range of about .002 to about .0035 weight percent, and an acyl halide in an amount in the range of about 50 to about 200 parts per million, and then treating the mixture thus obtained with a caustic wash.

13. A method according to claim 12 wherein the strength of said caustic wash is in the range of about 30 to about 50 Baumé.

References Cited in the file of this patent
UNITED STATES PATENTS

| | | |
|---|---|---|
| 2,329,615 | Hoover | Sept. 14, 1943 |
| 2,727,849 | Napper | Dec. 20, 1955 |